United States Patent
Das et al.

(10) Patent No.: US 10,965,812 B1
(45) Date of Patent: Mar. 30, 2021

(54) ANALYSIS AND CLASSIFICATION OF UNSTRUCTURED COMPUTER TEXT FOR GENERATION OF A RECOMMENDED CONVERSATION TOPIC FLOW

(71) Applicant: FMR LLC, Boston, MA (US)

(72) Inventors: Aniruddha Das, Kolkata (IN); Saurav Pattnaik, Malur (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/109,046

(22) Filed: Dec. 1, 2020

(51) Int. Cl.
| | |
|---|---|
| H04M 3/00 | (2006.01) |
| H04M 5/00 | (2006.01) |
| H04M 3/51 | (2006.01) |
| G10L 15/26 | (2006.01) |
| G06F 40/56 | (2020.01) |
| G06F 40/35 | (2020.01) |

(52) U.S. Cl.
CPC .......... *H04M 3/5191* (2013.01); *G06F 40/35* (2020.01); *G06F 40/56* (2020.01); *G10L 15/26* (2013.01); *H04M 3/5175* (2013.01)

(58) Field of Classification Search
CPC ......... G06F 40/35; G06F 40/56; G10L 15/26; H04M 3/5175; H04M 3/5191
USPC ............ 379/210.01, 265.01, 265.02, 265.03, 379/265.04, 265.05, 265.06, 265.07, 379/265.08, 265.09, 265.1, 265.11, 379/265.12, 265.13, 265.14, 266.01, 379/266.02, 266.03, 266.04, 266.05, 379/266.06, 266.07, 266.08, 266.09, 379/266.1
See application file for complete search history.

(56) References Cited

U.S. PATENT DOCUMENTS

| | | | |
|---|---|---|---|
| 9,442,930 B2 * | 9/2016 | Szucs | G06F 16/345 |
| 9,613,003 B1 * | 4/2017 | Goodspeed | G06F 16/487 |
| 9,894,206 B2 * | 2/2018 | Skiba | H04M 3/5175 |
| 10,038,786 B2 * | 7/2018 | Kannan | H04L 51/32 |
| 10,051,122 B2 * | 8/2018 | Raanani | G06N 7/005 |

(Continued)

OTHER PUBLICATIONS

Ebadi, Nima et al., "Implicit Life Event Discovery from Call Transcripts using Temporal Input Transformation Network," IEEE Access pp. (99):1-1, Nov. 2019, DOI: 10.1109/ACCESS.2019. 2954884, 11 pages.

(Continued)

*Primary Examiner* — Khai N. Nguyen
(74) *Attorney, Agent, or Firm* — Proskauer Rose LLP

(57) ABSTRACT

Methods and apparatuses are described for generating a recommended conversation topic flow. A server executes a topic modelling algorithm on voice call transcripts to determine a distribution of topics present in the transcripts. The server generates a historical topic flow for each transcript by determining topic-related words in text blocks in the transcript and assigning a score to each text block. The server categorizes each topic flow as positive or negative based upon outcomes associated with the transcript. The server trains a classification model using the categorized topic flows as input. The server captures a bitstream corresponding to a current voice call and converts the bitstream into unstructured text. The server executes the classification model on the unstructured text to determine whether a call topic flow is positive or negative. The server generates topic recommendations and transmits the recommendations to a second client device.

24 Claims, 8 Drawing Sheets

(56) References Cited

U.S. PATENT DOCUMENTS

| | | | | |
|---|---|---|---|---|
| 10,296,830 | B2* | 5/2019 | Cai | G06F 40/35 |
| 10,445,745 | B1* | 10/2019 | Chopra | G06F 16/31 |
| 10,484,541 | B2* | 11/2019 | Kannan | H04M 3/5183 |
| 10,599,697 | B2* | 3/2020 | Weissinger | G06F 16/35 |
| 2012/0130771 | A1* | 5/2012 | Kannan | G06Q 10/06393 |
| | | | | 705/7.32 |
| 2014/0362984 | A1* | 12/2014 | Danson | H04M 3/5175 |
| | | | | 379/265.06 |
| 2015/0256675 | A1* | 9/2015 | Sri | H04L 12/1827 |
| | | | | 379/265.09 |
| 2017/0147676 | A1* | 5/2017 | Jaidka | G06F 16/35 |
| 2018/0020095 | A1* | 1/2018 | Skiba | G06Q 30/016 |
| 2018/0308501 | A1* | 10/2018 | Johnson | G10L 17/06 |
| 2018/0359361 | A1* | 12/2018 | Kannan | H04L 12/1827 |
| 2019/0005023 | A1* | 1/2019 | Olsen | G06F 40/134 |
| 2019/0138597 | A1 | 5/2019 | Dowell et al. | |
| 2019/0362021 | A1* | 11/2019 | Balduino | G06F 40/30 |
| 2020/0137224 | A1* | 4/2020 | Rakshit | H04M 3/42 |
| 2020/0311739 | A1* | 10/2020 | Chopra | G06F 16/353 |

OTHER PUBLICATIONS

Chen, Xiaoju & Wang, Huajin, "Automated Chat Transcript Analysis Using Topic Modeling for Library Reference Services," 82nd Annual Meeting of the Association for Information Science & Technology, Melbourne, Australia, Oct. 19-23, 2019, 4 pages.

Blei, David M. et al., "Latent Dirichlet Allocation," Journal of Machine Learning Research 3 (2003), pp. 993-1022.

Landauer, Thomas K. et al., "Introduction to Latent Semantic Analysis," Discourse Processes 25 (1998), pp. 259-284.

Reidy, Pat, "An Introduction to Latent Semantic Analysis," published 2009, available at citeseerx.ist.psu.edu/viewdoc/download?doi=10.1.1.224.3831&rep=rep1&type=pdf, 10 pages.

Deshmukh, Ashwini & Hegde, Gayatri, "A Literature Survey on Latent Semantic Indexing," International Journal of Engineering Inventions, vol. 1, Issue 4 (Sep. 2012), pp. 1-5.

Hofmann, Thomas, "Probabilistic Latent Semantic Indexing," ACM SIGIR Forum, vol. 51, No. 2 (Jul. 2017), pp. 211-218.

Lee, Daniel D. & Seung, H. Sebastian, "Algorithms for Non-negative Matrix Factorization," Advances in Neural Information Processing Systems 13—Proceedings of the 2000 Conference (NIPS 2000), published Jan. 1, 2001, 7 pages.

\* cited by examiner

*Exemplary LDA Output*

| Documents | Topic1 | Topic2 | ...... | TopicK |
|---|---|---|---|---|
| Doc1 | 0.23 | 0.12 | ........ | 0.34 |
| Doc2 | 0.09 | 0.44 | ........ | 0.17 |
| ...... | | | ........ | |
| DocN | 0.22 | 0.08 | ........ | 0.71 |

| Topics | Word1 | Word2 | ...... | WordN |
|---|---|---|---|---|
| Topic1 | 0.06 | 0.11 | ........ | 0.07 |
| Topic2 | 0.12 | 0.19 | ........ | 0.22 |
| ...... | | | ........ | |
| TopicK | 0.31 | 0.02 | ........ | 0.57 |

FIG. 5

ANALYSIS AND CLASSIFICATION OF UNSTRUCTURED COMPUTER TEXT FOR GENERATION OF A RECOMMENDED CONVERSATION TOPIC FLOW

TECHNICAL FIELD

This application relates generally to methods and apparatuses, including computer program products, for analysis and classification of unstructured computer text for generation of a recommended conversation topic flow.

BACKGROUND

Recent advances in artificial intelligence (AI)-based computer technology enable systems to automatically parse large corpuses of unstructured computer text, convert the text into computer-readable representations, and execute one or more machine learning algorithms on the output to gain various actionable insights. One area where these techniques can be particularly useful is customer relationship management (CRM) and customer service. In one example, customer contact call centers often record most, if not all, incoming calls between a customer and an agent, and the corresponding call transcript is frequently converted into unstructured computer text and stored in a database for data analysis and data mining.

However, in a typical customer contact environment, where customers call in to speak with live agents, customers tend to be serviced with a one-size-fits all paradigm. For example, a customer service representative (CSR) generally speaks to all different customers in the same fashion—using the same tone of voice, the same speed, the same volume, the same word choice, and so forth. In addition, CSRs typically do not closely keep track of the topic flow of a conversation with a customer—with respect to the specific topics covered during an interaction, the transition between topics, the conversation style, and the identification of topics that drive a successful customer interaction (e.g., product adoption, customer engagement, etc.) or an unsuccessful one. As a result, it is difficult to recognize voice call topic flows that lead to successful customer interactions and to provide recommendations to CSRs—particularly during a live call—on how to adapt the conversation with the customer to improve the chance of success.

It would be beneficial to apply advanced artificial intelligence algorithms and methodologies to the large corpus of historical voice call transcript data in order to detect positive and negative topic flow patterns and corresponding call outcomes, then apply the learning from that analysis to provide real-time customer interaction and topic flow recommendations to live agents.

SUMMARY

Therefore, what is needed are methods and systems that utilize a large corpus of historical voice call transcript data in an artificial intelligence framework to generate recommendations and modifications to voice call customer-agent interactions to increase the likelihood of a successful outcome (e.g., an income-generating transaction or customer interaction). The techniques described herein provide the technical advantage of machine learning-based topic identification and topic flow generation for historical voice call transcripts to train a classification model, and then executing the trained classification against current voice call transcript data to generate one or more topic flow recommendations that are likely to increase the chance of a successful outcome on the current call. The techniques described herein further adapt existing live and/or automated communication sessions between computing devices based upon the prediction to effect changes to the communication style of a participant to the session based upon the classification model execution. In addition, the methods and systems provide for better training of customer service representatives on how to conduct effective conversation flows with customers that will lead to positive outcomes—as well as providing feedback to the CSRs in the form of a visual representation that compares the CSR's topic flow pattern against a benchmark positive (or negative) topic flow pattern.

The invention, in one aspect, features a system used in a computing environment in which unstructured computer text is analyzed for generation of a recommended conversation topic flow. The system comprises a server computing device having a memory for storing computer-executable instructions and a processor that executes the computer-executable instructions. The server computing device executes a topic modelling algorithm on a plurality of historical voice call transcripts to determine a weighted distribution of topics present in each of the historical voice call transcripts. The server computing device generates a historical topic flow for each historical voice call transcript by determining a frequency of topic-related words in each of a plurality of text blocks in the historical voice call transcript and assigning a score to each text block based upon (i) the frequency of topic-related words that are related to a single topic from the weighted distribution of topics or (ii) a relationship between the frequency of topic-related words related to a plurality of topics from the weighted distribution of topics. The server computing device categorizes each historical topic flow as positive or negative based upon one or more outcomes associated with the historical call transcript for the historical topic flow. The server computing device trains a voice call classification model using the categorized historical topic flows as input, the trained voice call classification model configured to generate recommended topic flows for incoming voice calls. The server computing device captures a bitstream corresponding to a current voice call between a user of a first client computing device and an agent of a second client computing device and converting the bitstream into unstructured computer text. The server computing device executes the voice call classification model using the unstructured computer text as input to determine whether a topic flow of the current voice call is positive or negative. The server computing device generates one or more topic recommendations for the current voice call based upon whether the topic flow of the current voice call is positive or negative by comparing the topic flow of the current voice call to a benchmark topic flow. The server computing device transmits the one or more topic recommendations to the second client computing device for display to the agent.

The invention, in another aspect, features a computerized method in which unstructured computer text is analyzed for generation of a recommended conversation topic flow. A server computing device executes a topic modelling algorithm on a plurality of historical voice call transcripts to determine a weighted distribution of topics present in each of the historical voice call transcripts. The server computing device generates a historical topic flow for each historical voice call transcript by determining a frequency of topic-related words in each of a plurality of text blocks in the historical voice call transcript and assigning a score to each text block based upon (i) the frequency of topic-related words that are related to a single topic from the weighted distribution of topics or (ii) a relationship between the frequency of topic-related words related to a plurality of topics from the weighted distribution of topics. The server computing device categorizes each historical topic flow as positive or negative based upon one or more outcomes associated with the historical call transcript for the historical topic flow. The server computing device trains a voice call classification model using the categorized historical topic flows as input, the trained voice call classification model configured to generate recommended topic flows for incoming voice calls. The server computing device captures a bitstream corresponding to a current voice call between a user of a first client computing device and an agent of a second client computing device and converting the bitstream into unstructured computer text. The server computing device executes the voice call classification model using the unstructured computer text as input to determine whether a topic flow of the current voice call is positive or negative. The server computing device generates one or more topic recommendations for the current voice call based upon whether the topic flow of the current voice call is positive or negative by comparing the topic flow of the current voice call to a benchmark topic flow. The server computing device transmits the one or more topic recommendations to the second client computing device for display to the agent.

Any of the above aspects can include one or more of the following features. In some embodiments, the server computing device performs one or more of: removing one or more stopwords from the historical voice call transcript; removing one or more non-domain-related words from the historical voice call transcript; removing one or more non-recognized words from the historical voice call transcript; or lemmatizing one or more phrases in the historical voice call transcript. In some embodiments, the topic modelling algorithm comprises one of: a Latent Dirichlet Allocation (LDA) algorithm, a Latent Semantic Analysis (LSA) algorithm, a Latent Semantic Indexing (LSI) algorithm, or a Non-negative Matrix Factorization (NMF) algorithm.

In some embodiments, generating a historical topic flow for each historical voice call transcript comprises: determining a call duration associated with the historical voice call transcript; and dividing the historical voice call transcript into a plurality of text blocks based upon the call duration, wherein each text block comprises an equal portion of the call duration. In some embodiments, generating a historical topic flow for each historical voice call transcript comprises: determining a number of words in the historical voice call transcript; and dividing the historical voice call transcript into a plurality of text blocks based upon the number of words, wherein each text block comprises an equal portion of the number of words.

In some embodiments, determining a frequency of topic-related words in each text block and assigning a topic to each text block comprises, for each text block: selecting a plurality of words in the text block; determining a relationship between the selected plurality of words; identifying a topic based upon the determined relationship; and assigning the identified topic to the text block. In some embodiments, determining a relationship between the selected plurality of words comprises: mapping the selected plurality of words to one or more topics in a database; and determining one of the topics that comprises a majority of the selected plurality of words.

In some embodiments, the one or more outcomes comprise a product purchase transaction, an account opening transaction, a website interaction transaction, or no transactions. In some embodiments, categorizing the historical topic flow as positive or negative based upon the one or more outcomes associated with the historical voice call transcript comprises: assigning a positive categorization to the historical topic flow when the one or more outcomes include a product purchase transaction, an account opening transaction, or a website interaction transaction; and assigning a negative categorization to the historical topic flow when the one or more outcomes include no transactions.

In some embodiments, converting the bitstream into unstructured computer text comprises executing a speech-to-text algorithm on the bitstream to generate the unstructured computer text. In some embodiments, generating one or more topic recommendations for the current voice call based upon whether the topic flow for the current voice call is positive or negative by comparing the topic flow of the current voice call to a benchmark topic flow comprises: generating a topic flow plot based upon the topic flow of the current voice call; identifying one or more topics in the historical topic flows that are categorized as positive; selecting one or more of the identified topics as topic recommendations for the current voice call; and appending the topic recommendations to the topic flow plot. In some embodiments, transmitting the one or more topic recommendations to the second client computing device for display to the agent comprises: displaying, on a display device of the second client computing device, the one or more topic recommendations while the current voice call is ongoing; and wherein the agent uses the displayed topic recommendations to introduce a new topic to the current voice call.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 5 is a diagram of an exemplary output of the LDA-based topic modelling algorithm executed by the topic modelling module of the server computing device.

DETAILED DESCRIPTION

Figure 1:
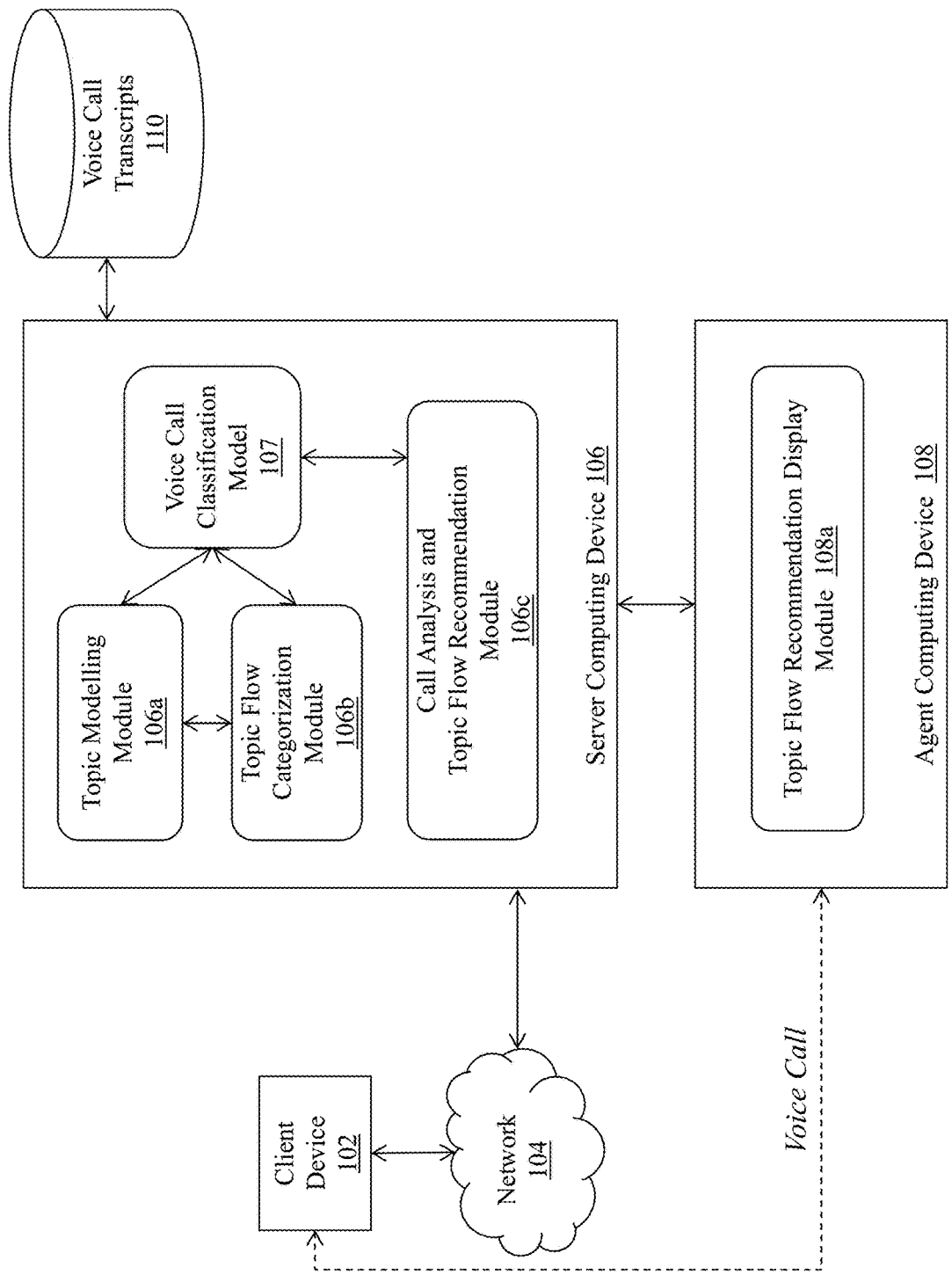
FIG. 1 is a block diagram of a system for automated, predictive analysis of user interactions to determine a modification to one or more features of the user interactions.

FIG. 1 is a block diagram of a system 100 for analysis and classification of unstructured computer text for generation of a recommended conversation topic flow. The system 100 includes a client computing device 102, a communications network 104, a server computing device 106 that includes a topic modelling module 106a, a topic flow categorization module 106b, a call analysis and topic flow recommendation module 106c, and a voice call classification model 107, an agent computing device that comprises a topic flow recommendation display module 108a and a voice call transcripts database 110 that includes historical voice call transcript data.

The client computing device 102 connects to the communications network 104 in order to communicate with the server computing device 106 to provide input and receive output relating to the process of analysis and classification of unstructured computer text for generation of a recommended conversation topic flow as described herein. Exemplary client computing devices 102 include but are not limited to computing devices such as smartphones, tablets, laptops, desktops, smart watches, IP telephony devices, internet appliances, or other devices capable of establishing a user interaction communication session, such as a voice call, with client computing device 103 via server computing device 106. It should be appreciated that other types of devices that are capable of connecting to the components of the system 100 can be used without departing from the scope of invention.

The agent computing device 108 is a computing device coupled to the server computing device 106 (e.g., either directly or via local communication network) and used to establish and participate in user interaction communication sessions that originate from the client computing device 102. In one example, the agent computing device 108 is a workstation (e.g., desktop computer, laptop computer, telephony device) of a customer service agent in a call center that enables the agent to receive voice calls from client device 102, access information and perform actions using software on the agent computing device 108 to provide responses and/or solutions to messages submitted by the client device 102. The agent computing device 108 is capable of executing locally-stored software applications and also capable of accessing software applications delivered from the server computing device 106 (or other computing devices) via a cloud-based or software-as-a-service paradigm. The software applications can provide a wide spectrum of functionality (e.g., CRM, account, sales, inventory, ordering, information access, and the like) to the agent. In some embodiments, the agent computing device 108 is a telephony device that is coupled to a computing device, where the telephony device receives a voice call that originated at the client computing device 102 and is routed either through the server computing device 106 as described herein or directly to the agent computing device 108. As can be appreciated, other types of client computing devices that can establish a voice communication session with the server computing device 106 and/or the client computing device 102 are within the scope of invention. In some embodiments, the agent computing device 108 is capable of conducting a text-based communication session (e.g., text chat, instant messaging) with the client computing device 102. For this type of communication session, the same principles for the voice call described herein can be applied to the text-based communications.

The communications network 104 enables the client computing device 102 to communicate with the server computing device 106 and the agent computing device 108. The network 104 is typically a wide area network, such as the Internet and/or a cellular network. In some embodiments, the network 104 is comprised of several discrete networks and/or sub-networks (e.g., cellular to Internet, PSTN to Internet, PSTN to cellular, etc.).

The server computing device 106 a device including specialized hardware and/or software modules that execute on a processor and interact with memory modules of the server computing device 106, to receive data from other components of the system 100, transmit data to other components of the system 100, and perform functions for analysis and classification of unstructured computer text for generation of a recommended conversation topic flow as described herein. The server computing device 106 includes a several computing modules 106a-106c that execute on one or more processors of the server computing device 106, and a specialized voice call classification model 107, which is a machine-learning based model that is trained and executed by the server computing device 106 as described herein. In some embodiments, the modules 106a-106c are specialized sets of computer software instructions programmed onto one or more dedicated processors in the server computing device 106 and can include specifically-designated memory locations and/or registers for executing the specialized computer software instructions.

Although the computing modules 106a-106c and the classification model 107 are shown in FIG. 1 as executing within the same server computing device 106, in some embodiments the functionality of the computing modules 106a-106c and the classification model 107 can be distributed among a plurality of server computing devices. As shown in FIG. 1, the server computing device 106 enables the computing modules 106a-106c and the classification model 107 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the computing modules 106a-106c and the classification model 107 is described in detail below.

The voice call transcripts database 110 is a computing device (or in some embodiments, a set of computing devices) coupled to the server computing device 106 and is configured to receive, generate, and store specific segments of data relating to the process of analysis and classification of unstructured computer text for generation of a recommended conversation topic flow as described herein. In some embodiments, all or a portion of the database 110 can be integrated with the server computing device 106 or be located on a separate computing device or devices. The database 110 can comprise one or more databases configured to store portions of data used by the other components of the system 100, as will be described in greater detail below. An exemplary database 110 is MySQL™ available from Oracle Corp. of Redwood City, Calif.

The database 110 includes historical voice call transcript data which, in some embodiments, is a dedicated section of the database 110 that contains specialized data used by the other components of the system 100 to perform the analysis and classification of unstructured computer text for generation of a recommended conversation topic flow as described herein. Further detail on the structure and function of the historical voice call transcript data is provided below.

Figure 2A:
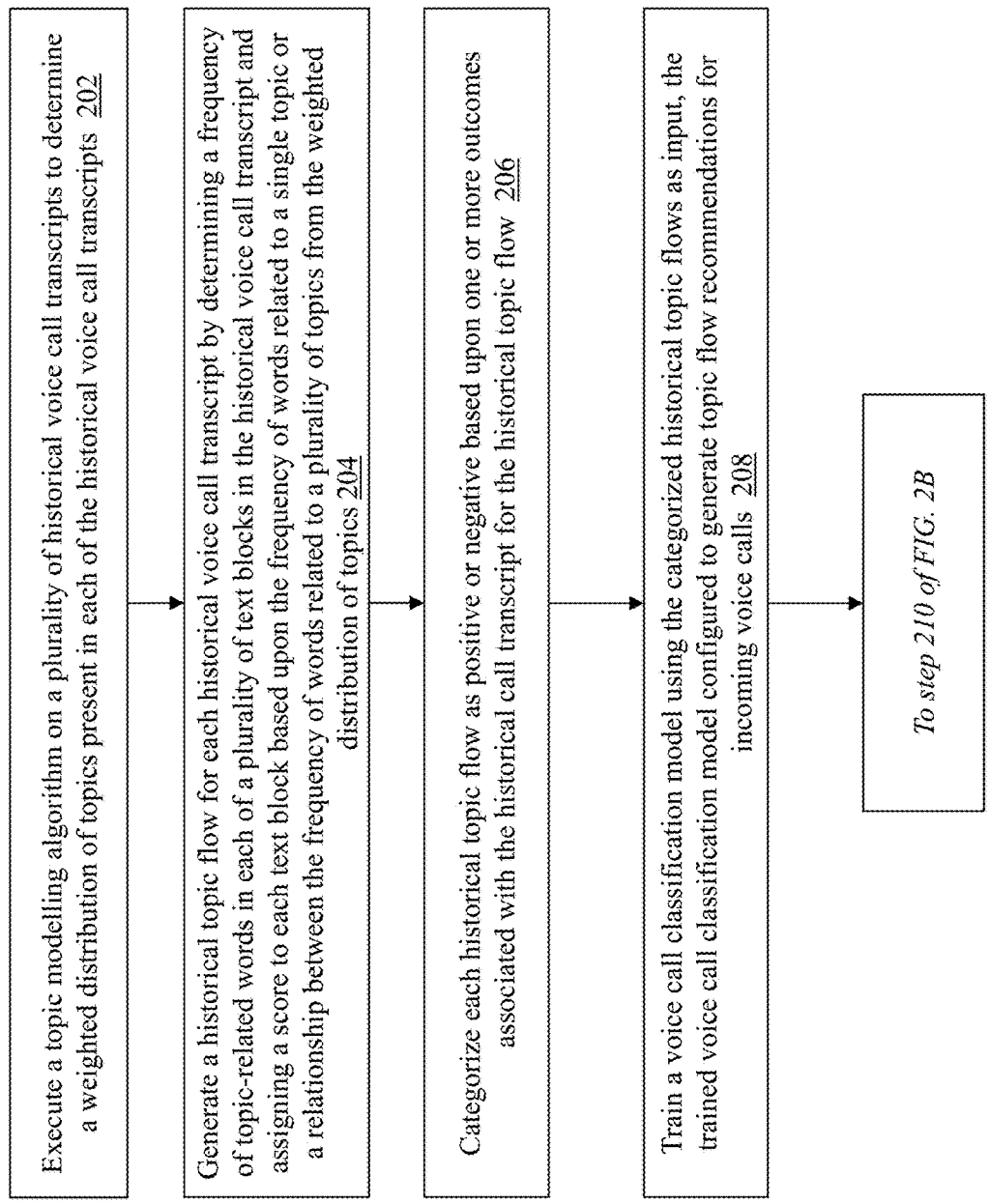
FIGS. 2A and 2B comprise a flow diagram of a computerized method for automated, predictive analysis of user interactions to determine a modification to one or more features of the user interactions.
Figure 2B:
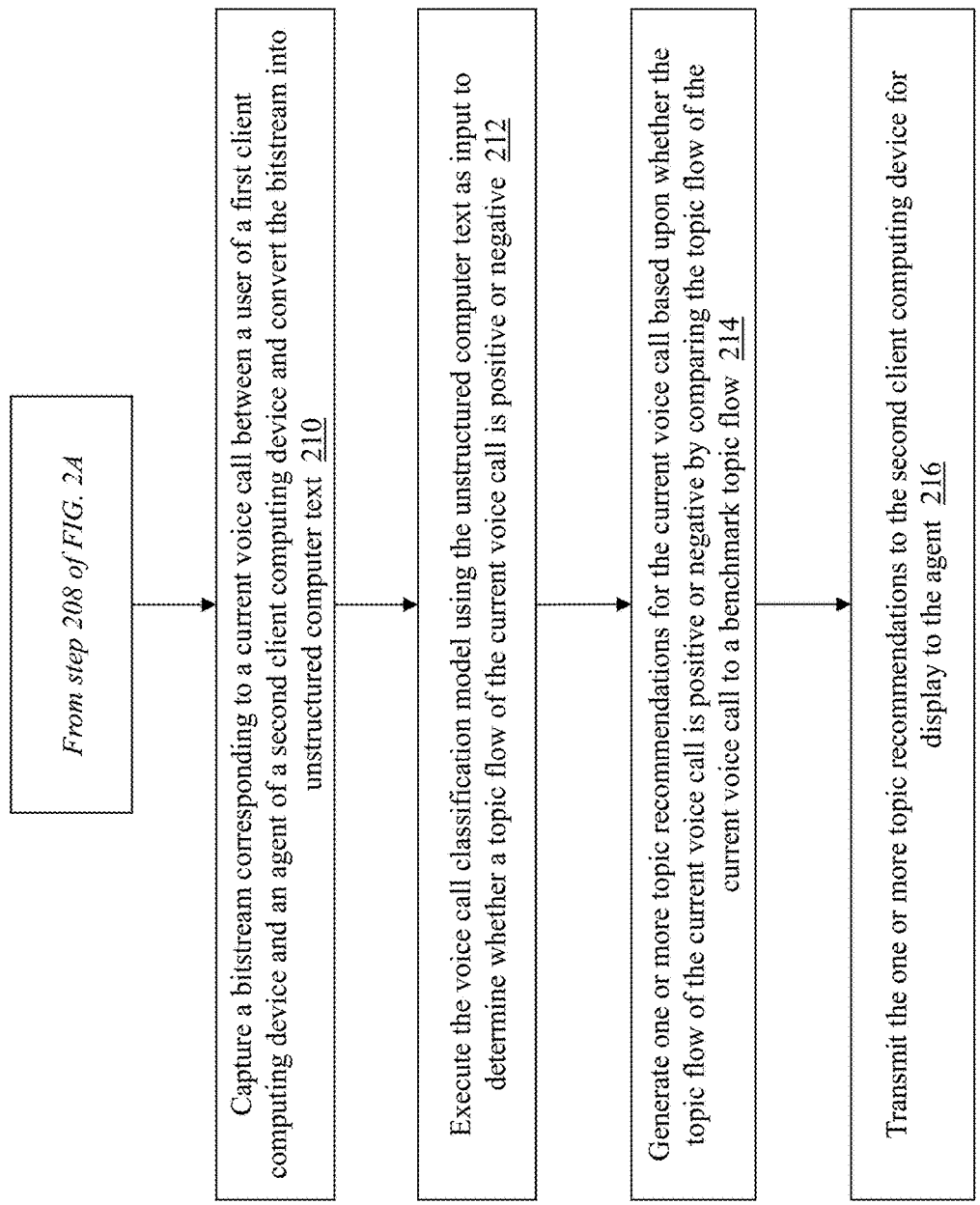

FIGS. 2A and 2B comprise a flow diagram of a computerized method 200 for analysis and classification of unstructured computer text for generation of a recommended conversation topic flow, using the system 100 of FIG. 1. In some embodiments, the method 200 is divided into two phases: a classification model training phase (FIG. 2A) and a classification model execution phase (FIG. 2B). Generally, during the training phase, the server computing device 106 analyzes historical voice call transcripts and related call outcomes to (i) determine one or more topic flows present in each historical voice call transcript and (ii) train a machine learning classification model to identify, based upon the call outcome, whether the topic flow is positive or negative. Generally, during the execution phase, the server computing device 106 captures unstructured computer text associated with a live or recently-concluded voice call between a customer and an agent, analyzes the unstructured computer text to determine a topic flow, and executes the trained machine learning classification model to generate and provide topic recommendations to the agent. Further detail on each of the training phase and the execution phase is provided below.

Beginning with the training phase as shown in FIG. 2A, the topic modelling module 106a retrieves a plurality of historical voice call transcripts from the voice call transcripts database 110. As can be appreciated, the historical voice call transcripts corresponds to prior voice calls between an agent and a customer. The server computing device 106 had captured the voice call and converted the voice call into unstructured computer text for storage in the voice call transcripts database 110. In some embodiments, the server computing device 106 captures, e.g., a digital bitstream of the historical voice calls and parses the bitstream to locate the speech segments associated with the agent (and in some embodiments, the customer as well). It should be appreciated that the server computing device 106 is capable of digitizing the voice segments, in the case that the segments are captured or otherwise received in non-digital form. The server computing device 106 can also perform functions to improve the audio quality of the digitized voice segments, such as adjusting compression, converting the segments to another format, reducing or eliminating background noise, and so forth. The server computing device 106 stores the captured digital audio file in database 116. It should be appreciated that, in some embodiments, the server computing device 106 continuously captures digitized voice segments from the agent and/or customer throughout the call and uses the voice segments in the manner described herein. For example, the server computing device 106 can be configured to continuously capture and measure digitized voice segments according to defined settings (e.g., 10-second segments, 20-second segments, 60-second segments).

The server computing device 106 can analyze the digitized voice segment(s) to convert the digitized voice segment(s) into unstructured computer text. In some embodiments, the server computing device 106 can utilize two core functionalities to convert the voice segment(s) into text: speech recognition and grammar analysis. In one example, the server computing device 106 can use a speech recognition library, such as the Speech Recognition API available from Microsoft Corporation, to convert the digitized speech file into text. In some embodiments, the server computing device 106 can leverage external resources, such as a grammar library accessible via the internet, in order to accurately determine the words and phrases contained within the digitized voice segment(s).

In some embodiments, the server computing device 106 can store metadata associated with the agent, the customer, or both in the voice call transcripts database 110 (or another database not shown in FIG. 1) and link the metadata to the corresponding voice call transcript. For example, the server computing device 106 can capture certain customer information (e.g., customer name, customer ID, account ID, etc.) that the customer may have provided and/or the agent may have pulled up during the voice call and associate the customer information with the voice call transcript. Similarly, the server computing device 106 can capture certain agent information (e.g., agent ID, agent name) associated with the agent servicing the voice call and store the agent information in connection with the voice call transcript.

In some embodiments, the customer information can be used to determine an outcome associated with the voice call. For example, the voice call may relate to a customer inquiring about certain products and the agent guiding them to a selection of products most appropriate for the customer's needs. The server computing device 106 can determine that, either during the call or after the call concluded, the customer decided to purchase one or more products that were discussed during the voice call—for example, the server computing device 106 can analyze one or more transactions or interactions that are linked to the customer ID retrieved as part of the voice call and determine that the customer executed a purchase transaction for the products discussed on the call. For example, the server computing device 106 can analyze transaction logs captured by other computing systems (e.g., web servers, account registers, merchant systems) to determine whether the customer took an action during or following the voice call. In this scenario, the outcome is determined to be a 'product purchase' and the outcome is stored in connection with the voice call transcript. The determination of an outcome can be time-limited, in that the server computing device 106 can be configured to analyze transaction data for a defined period of time during and/or following the voice call to confirm whether the transactions are likely to be connected to the voice call or whether the transactions could be considered as independent from the voice call. For example, the server computing device 106 can determine that only transactions taking place within seven days of the voice call should be classified as outcomes for the voice call. It should be appreciated that the time window can be adjusted according to any number of different considerations and/or business requirements.

It should be appreciated that outcomes can take a variety of different forms, including product purchase transaction, an account opening transaction, a website interaction transaction, or no transactions. The server computing device 106 can associate each outcome with a positive categorization or a negative categorization. For example, a product purchase transaction, and account opening transaction, and a website interaction transaction can all be considered as positive (e.g., because they resulted in either income or a further customer interaction). When the server computing device 106 cannot determine any follow-on transactions or interactions that relate to the voice call, the server computing device 106 can conclude that the outcome is 'no transactions'—which can be assigned a negative categorization (e.g., suggesting that the customer did not take any action or generate any income from the voice call). The outcome categorization can further be based upon different variables and metrics associated with the agent that participated in the voice call (e.g., based upon data obtained from a customer data warehouse, etc.). Based upon the positive or negative categorization, the server computing device 106 can determine whether the corresponding historical voice call was successful or not and whether that success is based upon the topic flow that occurred during the voice call—as described below.

Once the topic modelling module 106a retrieves the historical voice call transcripts, the module 106a executes (202) a topic modelling algorithm on the historical voice call transcripts to determine a weighted distribution of topics present in each of the historical voice call transcripts. In some embodiments, the topic modelling module 106a performs one or more preprocessing steps on the unstructured computer text of the historical voice call transcript to clean the text and convert the text to a form that is more suitable for execution of the topic modelling algorithm. In one example, the topic modelling module 106a can utilize logic to locate a terminator within each line of unstructured text and split the line of text into multiple phrases at each terminator. Types of terminators can include but are not limited to: punctuation (e.g., a period '.' signifying the end of a sentence), conjunctions or prepositions that serve to break up a sentence (e.g., "while," "but"). The topic modelling module 106a can further generate tokens from the unstructured text—where each token comprises a word in the overall phrase. In one embodiment, a token is a segment of the line of unstructured text that is separated by one or more spaces. As can be appreciated, a token is a fundamental unit that a text processing system typically works with. By generating tokens from the unstructured text, the system 100 can apply sophisticated algorithms, e.g., to identify the part-of-speech of each token, form trigrams that are used for other modules like sentiment mining, clustering, and so forth.

In some embodiments, the topic modelling module 106a removes one or more stopwords from the historical voice call transcript. As can be appreciated, stopwords are generally considered to be words in the unstructured computer text that are common to a given language and provide little or no value in determining the content and context of the unstructured text. Examples of English language stopwords include "a," "an," "the," "in," etc. The topic modelling module 106a can utilize a known stopword library or dictionary (e.g., NLTK stopword module available from NLTK.org) to identify and remove stopwords from the unstructured text and/or tokenized text.

The topic modelling module 106a can further remove one or more non-domain-related words from the historical voice call transcript. In some embodiments, the agent can specialize in a certain field or provide service for specific products or services (e.g., financial accounts)—therefore, certain terms or words in the voice call transcript can be associated with that 'domain.' As a result, non-domain related words can comprise words that occur in the voice call transcript but are unrelated to the domain and therefore do not add value to the content and/or context of the voice call. The topic modelling module 106a can be configured with a domain-specific dictionary that identifies domain-specific words and/or filters non-domain-specific words.

In addition, the topic modelling module 106a can remove one or more non-recognized words and/or noises from the voice call transcript. For example, during a voice call, the customer and/or the agent may utter unrecognizable words or sounds (perhaps due to distortion of the audio) or verbal fillers (such as "um," "er") that do not correspond to lexical words. The topic modelling module 106a can be configured to remove these words and phrases from the unstructured computer text. This step in some embodiments also includes removing extraneous information in the text corpus that does not relate to the substance of the textual content, such as certain symbols and digits (e.g., slashes (/), dashes (-), carrots (^), etc.) that may be artifacts of the speech-to-text conversion process.

The topic modelling module 106a can also lemmatize one or more phrases in the historical voice call transcript, meaning that the module 106a sorts and/or groups the inflected forms of a word so the words can be analyzed as a single 'item.' For example, the transcript may include several forms of a particular word—e.g., "invest," "invested," "investing," "investor," etc. The module 106a can group these words according to their particular lemma, i.e., "invest."

Once the topic modelling module 106a has prepared the unstructured computer text from one or more of the historical voice call transcripts, the module 106a executes a topic modelling algorithm on the transcript(s) as noted above to determine a weighted distribution of topics present in each of the historical voice call transcript(s). It can be appreciated that there are multiple different topic modelling algorithms available for execution by the module 106a, such as Latent Dirichlet Allocation (LDA) (as described in Blei et al., "Latent Dirichlet Allocation," *Journal of Machine Learning Research* 3 (2003), pp. 993-1022, incorporated herein by reference), Latent Semantic Analysis (LSA) (as described in Landauer et al., "An Introduction to Latent Semantic Analysis," *Discourse Processes,* 25, pp. 259-284, and as described in Reidy, "An Introduction to Latent Semantic Analysis," (2009) available at citeseerx.ist.psu.edu/viewdoc/download?doi=10.1.1.224.3831&rep=rep1&type=pdf, each of which is incorporated herein by reference) or Latent Semantic Indexing (LSI) (as described in Deshmukh and Hegde, "A Literature Survey on Latent Semantic Indexing," *International Journal of Engineering Inventions*, Vol. 1, Issue 4 (September 2012), pp. 1-5, and as described in Hofmann, "Probabilistic Latent Semantic Indexing," SIGIR '99: Proceedings of the $22^{nd}$ Annual International ACM SIGIR Conference on Research and Development in Information Retrieval, August 1999, pp. 50-57, each of which is incorporated herein by reference), and Non-negative Matrix Factorization (NMF) (as described in Lee and Seung, "Algorithms for Non-negative Matrix Factorization," Advances in Neural Information Processing Systems 13—Proceedings of the 2000 Conference, NIPS 2000, published Jan. 1, 2001, incorporated herein by reference. The embodiment herein is described in reference to LDA, but other types of topic modelling algorithms and approaches can be used without departing from the scope of invention.

Figure 3:
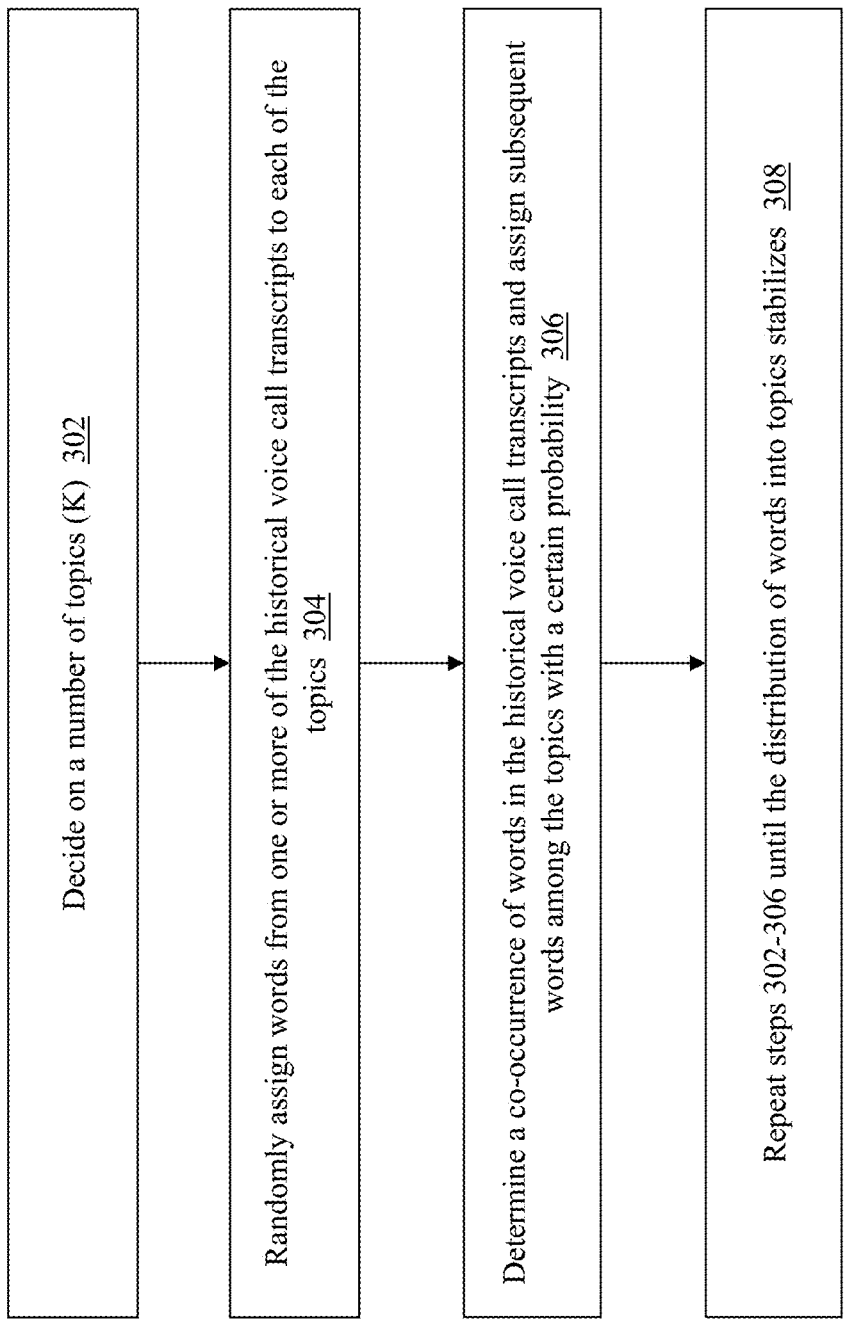
FIG. 3 is a flow diagram of an exemplary LDA-based topic modelling algorithm used by the topic modelling module of the server computing device.

FIG. 3 is a flow diagram of an exemplary LDA-based topic modelling algorithm 300 used by the topic modelling module 106a. The general principle behind the LDA algorithm is that each document (i.e., historical voice call transcript) can be described by a distribution of topics and each topic can be described by a distribution of words. The LDA algorithm uses an iterative approach to fine tune the distribution of words into topics as follows:

Step 1: the module 106a decides (302) on a number of topics (K)—in some embodiments, the module 106a can be configured to decide upon a predetermined number of topics (e.g., 3, 5, 25, 100) by analyzing the unstructured computer text provided as input. For example, based on the number of transcripts and/or different words in the transcripts, the module 106a can determine a number of topics that may be represented in the unstructured computer text. It should be understood that the topics at this point are not labeled, instead they are simply logical groupings of words that the module 106a has created, independent of meaning. Also, in some embodiments the number of topics is not predetermined. When the module 106a analyzes on the historical voice call transcripts, the module 106a can compare the goodness-of-fit of LDA models fit with varying numbers of topics. The goodness-of-fit of an LDA model can be evaluated by calculating the perplexity of a test set of documents. With lower perplexity, the model stabilizes. There is a validation required to see whether topic-related words are coherent within a particular topic and distinct from the words from the other topic(s). In some embodiments, the labelling of any topic generated by the LDA model is done based on the logic and understanding of the business, where this technique is used. For example, Cats, Dogs, Cows are all associated with a topic of Animal, which can be introduced into the system. Another example—Guaranteed income, Future Income, Lifetime income, stream of income, steady paycheck etc. associates with the Income Generation topic.

Step 2: the module 106a randomly assigns (304) words from one or more of the historical voice call transcripts to one or more topics—for example, the module 106a can select a first historical voice call transcript and randomly assign words from the transcript to one or more of the topics. In some embodiments, the module 106a assigns a probability score to each word for the word's association with one or more topics, and the probability scores get revised with each iteration based on occurrences of those words. Once the module 106a stabilizes, the words with probability scores above a pre-determined threshold are considered to be associated with those topics.

Step 3: for each subsequent historical voice call transcript, the module 106a determines a co-occurrence of words in the transcripts and assigns a probability score to subsequent words (and in some embodiments, re-allocates the initially randomized words) within the topic, based upon the co-occurrence of words. For example, the module 106a can determine that the word "income" from a historical voice call transcript should be assigned to a first topic based upon recognizing that the word "income" from another historical voice call transcript has previously been assigned to that topic. In some embodiments, the module 106a goes through each document/transcript and randomly assigns each word in the document to one of k topics. For each document d, the module 106a goes through each word w and computes: (1) the probability of words in document d that are assigned to topic t, i.e., the module 106a tries to capture how many words belong to the topic t for a given document d excluding the current word. If a lot of words from document d belong to topic t, it is more probable that word w belongs to topic t; and (2) the probability of the association to topic t over all documents, where the association is based upon this word w, i.e., the module 106a tries to capture how many documents are in topic t because of word w.

LDA represents documents as a mixture of topics. Similarly, a topic is a mixture of words. If a word w has high probability of being in a topic t, all the documents having w will be more strongly associated with t as well. Similarly, if it is not very probable that w will be in t, the documents which contain the w will have a very low probability of being in t, because the rest of the words in document d will belong to some other topic(s) and hence d will have a higher probability for those topic(s). So even if w gets added to t, it won't be associating many such documents to t. Again, at this point, each topic is simply a collection of words that may or may not have a logical relationship with each other and has not yet been labeled with a 'topic' or 'theme' that unifies the words.

The topic modelling module 106a repeats (308) the above steps 302-306 on the entire set of historical voice call transcripts until the distribution of words into the topics stabilizes and the module 106a is unable to make any significant refinements. For example, the module 106a can determine that after several iterations, the same words are being assigned to the same topics consistently and the module 106a does not need to make different determinations or move words from one topic to another.

In some embodiments, the topic modelling module 106a can repeat the topic modelling algorithm as described in FIG. 3 for any of a number of different topics (e.g., K−2, K−1, K+1, K+2, etc.) to identify what topic distribution results in word groupings that evidence a logical connection with each other, thereby enabling the assignment of a topic or theme to the grouping of words. For example, the module 106a can determine that a specific grouping of words that includes "retirement," "income," "IRA," "distributions," "RMD," etc. can be assigned the topic of "Retirement Income." In another example, the module 106a can determine that a specific grouping of words that includes "dog," "cat," "loyal," "animal," "friend," "evil" etc. can be assigned the topic of "Animals." In some embodiments, the topic modelling module 106a utilizes an associative topic dictionary to categorize the words in a topic and assign a topic label to the grouping of words.

Figure 4:
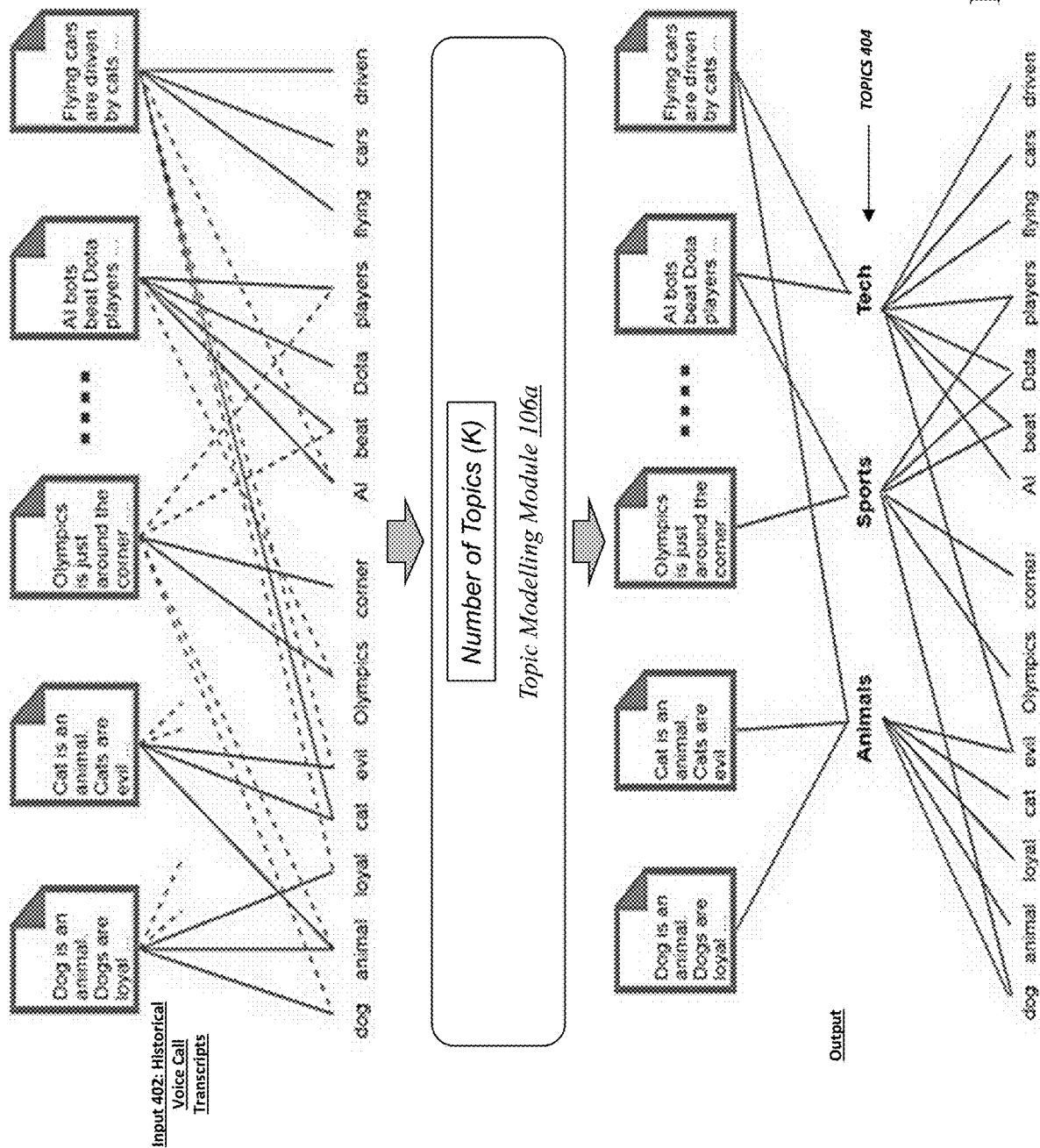
FIG. 4 is a workflow diagram of the exemplary LDA-based topic modelling algorithm executed by the topic modelling module of the server computing device.

FIG. 4 is a workflow diagram of an exemplary LDA algorithm executed by the topic modelling module 106a. As shown in FIG. 4, the topic modelling module 106a receives as input 402 the unstructured computer text from the historical voice call transcripts and determines a number of topics (K) based upon the input. Then, as described above in FIG. 3, the module 106a assigns the words to one or more of the topics 404. FIG. 5 is a diagram of an exemplary output of the LDA algorithm executed by the topic modelling module 106a. As shown in FIG. 5, the LDA output can be one or more multidimensional vectors that represent a weighted distribution of topics in each of the historical voice call transcript and represent a weighted distribution of words in each of the topics. For example, for a given document Doc1, each of the topics determined by the topic modelling module 106a is assigned a weight value (e.g., Topic1=0.33, etc.) based upon the relative occurrence of that topic in the document. Likewise, for a given topic Topic1, each of the words assigned to that topic is assigned a weight value (e.g., Word1=0.06, etc.) based upon the relative occurrence of that word in the topic. In some embodiments, weights can range from 0.01 to 0.99, with a higher value indicating a higher occurrence of the topic/word, respectively. It should be appreciated that other types of weighting systems can be used without departing from the scope of invention.

Furthermore, it should be appreciated that in a typical implementation, the sheer volume of historical voice call transcript data and number of possible topic assignments and combinations makes it impractical, if not impossible, to analyze the historical voice call transcript data without relying on advance machine learning techniques as provided herein. For example, in one embodiment the historical voice call transcripts database 110 comprises 50,000 transcripts, with approximately 5,000 words per conversation. Performing the topic modelling algorithm described above in a typical process over 200 iterations necessitates the use of machine learning techniques and computing modules.

Turning back to FIG. 2A, once the weighted distribution of topics has been generated, the topic flow categorization module 106b generates (204) a historical topic flow for each historical voice call transcript by determining a frequency of topic-related words in each of a plurality of text blocks in the historical voice call transcript and assigning a score to each text block based upon (i) the frequency of words related to a single topic from the weighted distribution of topics or (ii) a relationship (e.g., ratio, sum, difference, etc.) between the frequency of words related to a plurality of topics from the weighted distribution of topics. As can be appreciated, a single voice call transcript can comprise any of a number of different topics—for example, a sales agent and a customer may transition between a variety of topics (e.g., introduction/greetings→income→annuity→retirement, etc.) as they discuss the needs and goals of the customer. Because in some instances the entire voice call transcript can be quite large (e.g., 5,000 or more words), an advantageous approach employed by the topic flow categorization module 106b is to break down the entire corpus of the voice call transcript into smaller blocks of text in order to better identify specific topics in the transcript and determine transitions between topics.

In some embodiments, the topic flow categorization module 106b can utilize timestamps or other chronological markers associated with the historical voice call transcript to separate the transcript into blocks. For example, the voice call may be captured/recorded with timestamps that track the timeline and duration of the call and the module 106b can partition the unstructured computer text for the transcript into blocks of text using the associated timestamps (e.g., every 30 seconds corresponds to one block). Other types of indicators can be used to break the unstructured computer text into blocks, such as number of words.

When the blocks of text are generated, the topic flow categorization module 106b determines, for each topic, a frequency (or in some embodiments, a ratio/weight) of words relating to that topic in each text block. For example, in a particular block of text, the word "income" may appear 35 times and the word "retirement" appears 16 times. The module 106b can determine that the block of text should be assigned the topic "Retirement Income" because those words were previously assigned to the "Retirement Income" topic (as described in step 202 of FIG. 2A). In another example, the word "income" may appear in a block of text 6 times, but there could be 800 words in the block of text—resulting in a ratio for the word "income" of only 0.0075. Therefore, based upon this ratio, the module 106b can determine that the "Retirement Income" topic should not be applied to the block of text due to the low occurrence relative to other words.

Using the above methodology, the topic flow categorization module 106b generates a historical topic flow for each historical voice call transcript, with a topic assigned to each block of text in the transcript. For example, the module 106b can generate a topic flow of:

Income→Market→Income→Income based on the topic assigned to each block of text. It should be appreciated that more than one topic can be assigned to each block of text—such as:

$$\frac{\text{Income}}{\text{Market}} \to \frac{\text{Market}}{\text{Plan}} \to \frac{\text{Income}}{\text{Market}} \to \frac{\text{Income}}{\text{Annuity}}$$

and so forth.

The topic flow categorization module 106b categorizes (206) each historical topic flow as positive or negative based upon one or more outcomes associated with the historical call transcript for the historical topic flow. As mentioned previously, the historical voice call transcripts can each be associated with one or more outcomes—e.g., product purchase, website interaction, account opening, no transactions, etc.—determined by the server computing device 106. The topic flow categorization module 106b can analyze the outcome(s) and categorize each historical topic flow based upon the outcome(s). As set forth above, a transaction can be considered as positive (e.g., because it resulted in either income or a further customer interaction) or negative including the case of no transactions (e.g., suggesting that the customer did not take any action or generate any income from the voice call). Therefore, the topic flow categorization module 106b can attribute the positive or negative nature of the outcome(s) to the historical topic flow and store this categorization in a database.

Using the categorized historical topic flows as input, the topic flow categorization module 106b trains (208) a voice call classification model 107 to generate topic flow recommendations for incoming voice calls. Based upon the large corpus of historical voice call data, the model is trained to identify specific topic flows that are associated with a successful outcome/positive categorization, and determine subsequent topic recommendations that are likely to follow next in the topic flow. For example, using an input topic flow that received a positive categorization, the module 106b can train the classification model to predict what topic should come next in a given topic flow to either maintain the positive categorization or increase the likelihood of a positive categorization result.

In summary, in some embodiments the topic modelling module 106a receives as input the historical voice call transcripts, performs preprocessing of text, and generates the topics as described above with reference to FIG. 3. As mentioned previously, these topics can be generated by any of a number of different topic modelling algorithms (e.g., LDA, LSA, LSI, NMF). In the example of LDA, the module 106a looks into a set of M documents having N words, where each word is generated by a topic from a set of K topics and provides two probability matrices: document-topic and topic-term, as the outcome $$P(\theta_{1:M}, z_{1:M}, \beta_{1:k} | D; \alpha_{1:M}, \eta_{1:k})$$

where

θ: a distribution of topics, one for each document (given by document-topic matrix);

z: N topics for each document;

β: a distribution of words, one for each topic (given by topic-term matrix);

given,

D: all the data we have (i.e. input)

and using parameters

α: parameter vector for each document (document—Topic distribution). Higher the a, higher the probability of all topics appearing in all documents η: parameter vector for each topic (topic—word distribution). Higher the higher the probability of all terms appearing in all topics.

For example, the topic modelling module 106a can create topics for financial planning calls, e.g., (1) market conditions, (2) income generation, (3) taxations, (4) expense planning, (5) money growth, (6) current portfolio, (7) annuity, (8) other products, etc.

Figure 7:
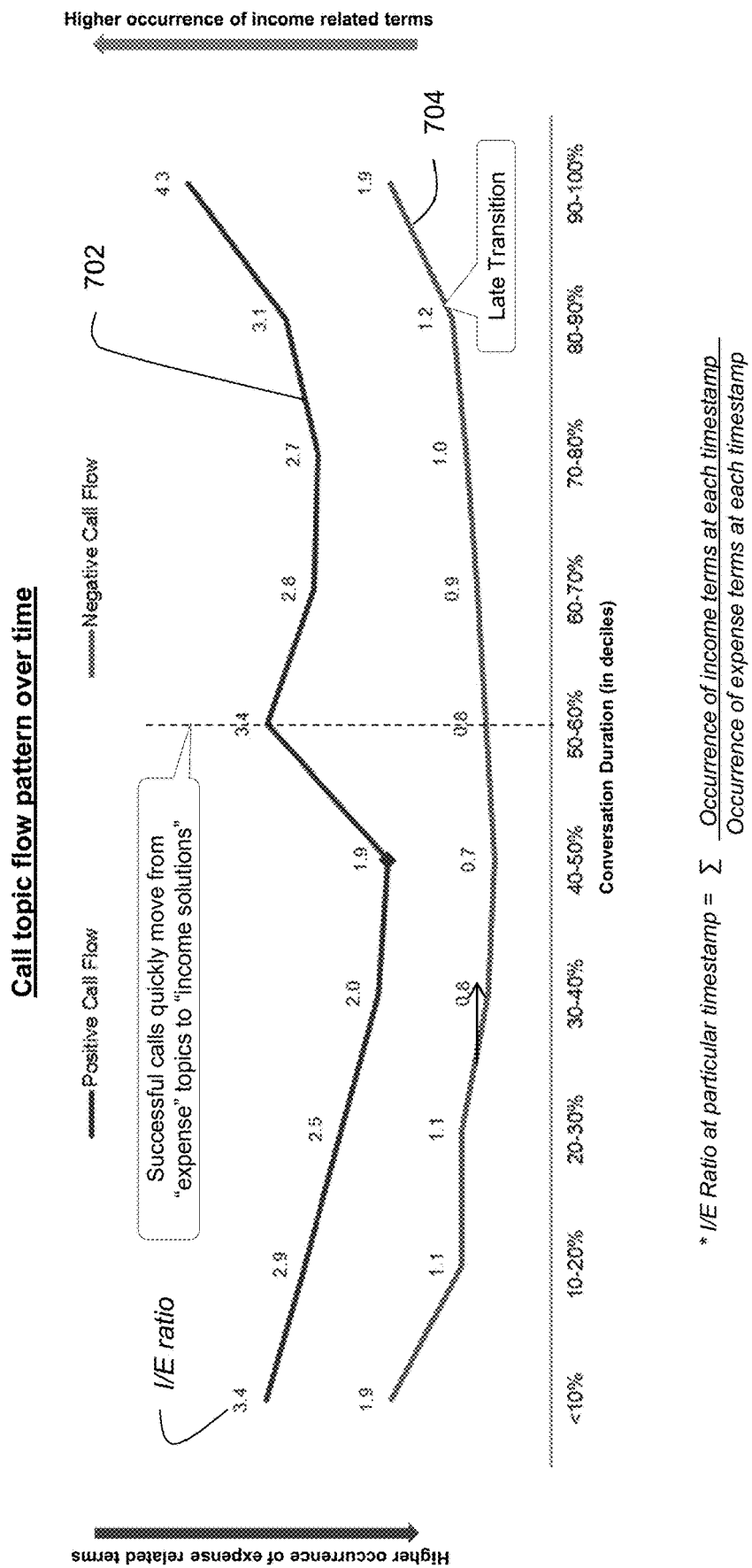
FIG. 7 is a diagram of an exemplary graph showing a positive and negative call topic flow pattern over time.

Then the topic flow categorization module 106b breaks down the call transcripts into smaller sub-blocks, where each sub-block comprises an equal portion of call duration or equal portion of the number of words, and identifies the topics' weightage for each subsection—thereby providing a weighted topic flow plot for each call transcript. Based on the outcome of the historical calls, the calls are then categorized as positive or negative and the module 106b finally gives an average weighted topic flow plot for positive and negative calls (as shown in FIG. 7). For example, in FIG. 7 a positive call flow (line 702) quickly moves from "expense" topics to "income solutions" topics—indicated by the higher income-to-expense (FE) ratio values at the particular timestamps. Conversely, a negative call flow (line 704) has a later transition in the call from "expense" topics to "income solutions" topics—indicated by the lower I/E ratio values at the particular timestamps.

In one example, for any kind of positive call which leads to a sale of annuity, a preferred topic flow plot is:

Portfolio→Expense Planning→Income Generation-
        →Annuity

While for a negative call, which leads to no sales, a topic flow plot could be

Expense Planning→Expense Planning→Market Con-
        ditions→Other Products

As can be appreciated, the topic flow plots can also have one or more combinations of topics (as shown in FIG. 7), which can be represented by absolute weights or ratio of multiple weights on the plots.

Once the voice call classification model 107 is trained on the historical voice call transcript data as described above, the call analysis and topic flow recommendation module 106c can execute the trained classification model 107 to generate topic recommendations for in-process voice calls (as a way to influence the success of voice calls) and/or recently-concluded voice calls (as a way to train customer service agents in topic flows to improve their future performance). For example, the call analysis and topic flow recommendation module 106c can generate a topic flow for the unstructured computer text of the current voice call (using the techniques noted above in FIG. 2A and FIG. 3) and the model 107 can generate a classification for the topic flow (i.e., positive or negative) based on its training on historical topic flows, thereby giving reps a quick snapshot of the topic flows in their current calls and also recommendation for leading the call to a successful outcome.

Turning to FIG. 2B, the call analysis and topic flow recommendation module 106c captures (210) a bitstream corresponding to a current voice call between a user of a first client computing device 102 and an agent of a second client computing device 108 and converts the bitstream into unstructured computer text. The client computing device 102 initiates a communication session (e.g., voice call) via communications network 104 to, e.g., server computing device 106. For example, a user at client computing device 102 can launch a telephony application (for voice) which establishes a connection to server computing device 106. The server computing device 106 can route the communication session to agent computing device 108 (e.g., a workstation of a customer service agent) to participate in the communication session with the client computing device 102.

As the user of client computing device 102 and the agent at agent computing device 108 begin speaking to each other in the case of a voice call, the server computing device 106 can capture one or more digitized voice segments corresponding to speech of the agent and/or customer—as the parties discuss a particular topic. For example, the user may be asking a question about certain products or services, the user may be requesting information about his or her account, or the user may be providing a complaint. In some embodiments, the server computing device 106 captures, e.g., a digital bitstream of the voice call and parses the bitstream to locate the speech segments associated with the agent. It should be appreciated that the server computing device 106 is capable of digitizing the voice segments, in the case that the segments are captured or otherwise received in non-digital form. The server computing device 106 can also perform functions to improve the audio quality of the digitized voice segments, such as adjusting compression, converting the segments to another format, reducing or eliminating background noise, and so forth. The server computing device 106 stores the captured file in database 116. It should be appreciated that, in some embodiments, the server computing device 106 continuously captures digitized voice segments from the agent throughout the call and uses the voice segments in the manner described herein. For example, the server computing device 106 can be configured to continuously capture and measure digitized voice segments according to defined settings (e.g., 10-second segments, 20-second segments, 60-second segments).

The server computing device 106 can analyze the digitized voice segment to convert the digitized voice segment into unstructured computer text. In some embodiments, the server computing device 106 can utilize two core functionalities to convert the voice segment into text: speech recognition and grammar analysis. In one example, the server computing device 106 can use a speech recognition library, such as the Speech Recognition API available from Microsoft Corporation, to convert the digitized speech file into text. In some embodiments, the server computing device 106 can leverage external resources, such as a grammar library accessible via the internet, in order to accurately determine the words and phrases contained within the digitized voice segment.

In some embodiments, the call analysis and topic flow recommendation module 106c can perform one or more pre-processing steps on the extracted computer text—such as the stopword removal, lemmatization, non-domain word removal, and unrecognized word removal described above with respect to FIG. 2A.

The call analysis and topic recommendation flow module 106c then executes (212) the voice call classification model 107 using the unstructured computer text extracted from the current voice call as input to determine whether a topic flow of the current voice call is positive or negative (e.g., determine how the current voice call compares to a historical voice call transcript whose topic flow was categorized as positive or negative). For example, the module 106c can generate a topic flow for the unstructured computer text of the current voice call (using the techniques noted above in FIG. 2A and FIG. 3) and the model 107 can generate a classification for the topic flow (i.e., positive or negative) based on its training on historical topic flows.

Based upon the classification produced by the voice call classification model 107, the call analysis and topic flow recommendation module 106c can generate (214) one or more topic recommendations for the current voice call. For example, the model 107 may determine that the classification for the current voice call is negative (indicating a likelihood that the call will result or has resulted in an undesired outcome, such as no follow-on transactions). In view of this classification, the call analysis and topic flow recommendation module 106c can analyze one or more historical "benchmark" topic flows (including transitions between topics) associated with voice calls that did have a positive categorization and provide recommendations of topics that could achieve an increase in the likelihood that the current voice call will result in a positive outcome. For example, the module 106c executes the voice call classification model 107 to determine that the current topic flow of:

Plan→Expense→Expense has a negative categorization. Based on this, the module 106c can determine one or more topics from historical benchmark voice calls that were positive and provide those topics as recommendations. In some embodiments, the module 106c locates historical voice call transcripts that have a similar initial topic flow as the current call and determines which of these calls (if any) have a positive categorization, such as:

Plan→Expense→Expense→Market→Income→Annuity→Annuity which resulted in a product purchase transaction.

The module 106c compares the current topic flow to one or more benchmark topic flows and can determine that the agent should try to transition to one or more of the Market, Income, or Annuity topics in order to influence the chance of success of the current voice call.

Figure 6:
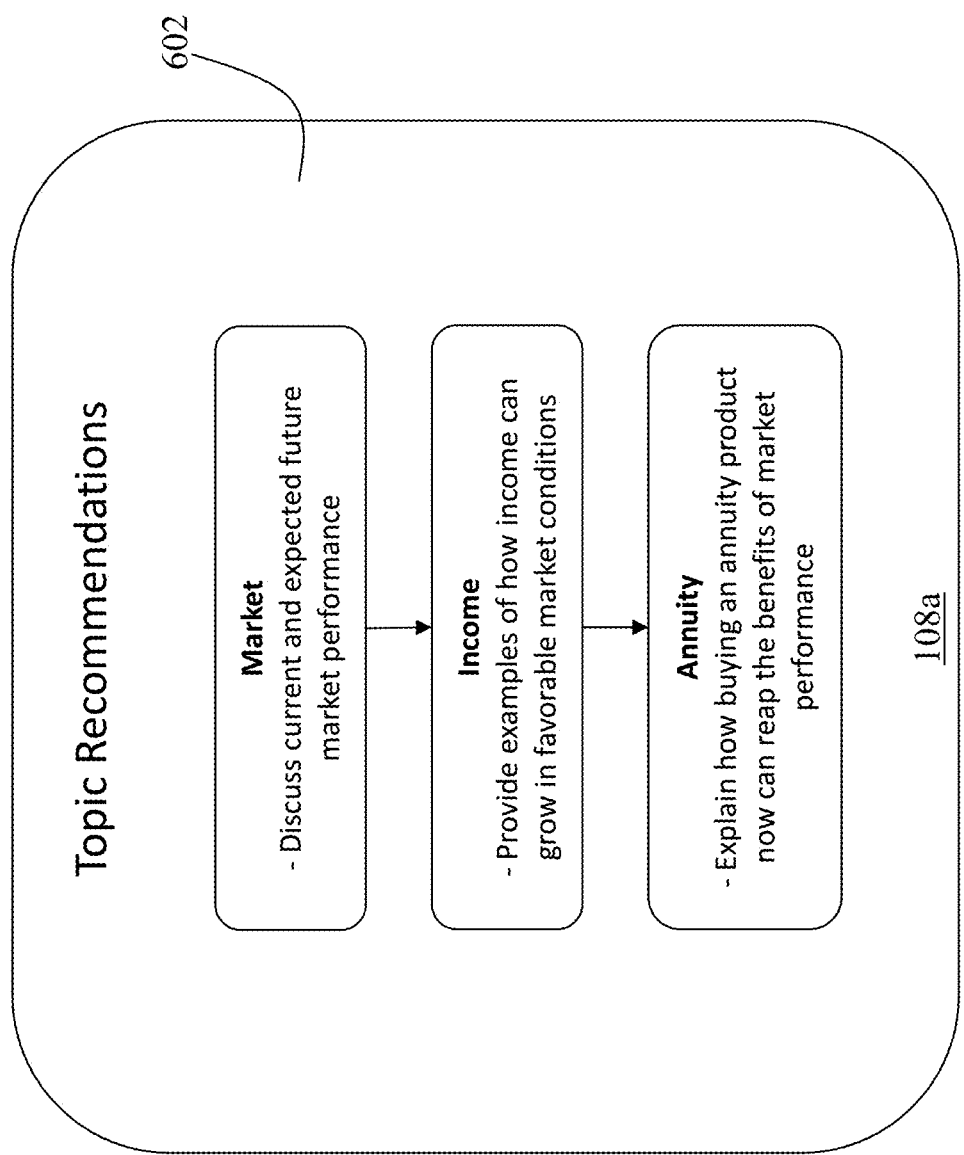
FIG. 6 is an exemplary embodiment of a topic recommendation display generated by the agent computing device.

Once the topic recommendations are generated, the call analysis and topic flow recommendation module 106c transmits (216) the one or more topic recommendations to the agent computing device 108 for display to the agent. In one embodiment, the topic flow recommendation display module 108a of agent computing device 108 receives the topic recommendations in a packet-based message and executes software (e.g., launching a GUI) that displays the topic flow recommendations in a visual format (e.g., a topic flow plot) for the agent to reference during the voice call. FIG. 6 is an exemplary embodiment of a topic recommendation display 602 generated by the agent computing device 108. As shown in FIG. 6, the display 602 comprises a flow of recommended topics (e.g., Market, Income, Annuity) intended to guide the agent into areas of conversation with the customer that may result in a positive outcome for the call. The agent can view these topics in real-time during the call or shortly after a call is concluded in order to learn how the topic flow can be utilized or changed to provide better results. In some embodiments, one or more of the recommended topics can be supplemented with questions, conversation starters, etc. that can further instruct the agent on what to say, how to say it, etc. in order to effect the proper topics and transitions between topics. In some embodiments, the topic recommendations displayed by the agent computing device 108 can further comprise the topics that have already been discussed during the current voice call and can comprise a visual indicator for the agent to recognize whether a given topic is likely or unlikely to lead to a positive result (e.g., red=unlikely, green=likely, etc.).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system used in a computing environment in which unstructured computer text is analyzed for generation of a recommended conversation topic flow, the system comprising a server computing device having a memory for storing computer-executable instructions and a processor that executes the computer-executable instructions to:
   execute a topic modelling algorithm on a plurality of historical voice call transcripts to determine a weighted distribution of topics present in each of the historical voice call transcripts;
   generate a historical topic flow for each historical voice call transcript by determining a frequency of topic-related words in each of a plurality of text blocks in the historical voice call transcript and assigning a score to each text block based upon (i) the frequency of topic-related words that are related to a single topic from the weighted distribution of topics or (ii) a relationship between the frequency of topic-related words related to a plurality of topics from the weighted distribution of topics;
   categorize each historical topic flow as positive or negative based upon one or more outcomes associated with the historical call transcript for the historical topic flow;
   train a voice call classification model using the categorized historical topic flows as input, the trained voice call classification model configured to generate recommended topic flows for incoming voice calls;
   capture a bitstream corresponding to a current voice call between a user of a first client computing device and an agent of a second client computing device and converting the bitstream into unstructured computer text;
   execute the voice call classification model using the unstructured computer text as input to determine whether a topic flow of the current voice call is positive or negative;
   generate one or more topic recommendations for the current voice call based upon whether the topic flow of the current voice call is positive or negative by comparing the topic flow of the current voice call to a benchmark topic flow; and
   transmit the one or more topic recommendations to the second client computing device for display to the agent.

2. The system of claim 1, wherein the server computing device performs one or more of:
   removing one or more stopwords from the historical voice call transcript;
   removing one or more non-domain-related words from the historical voice call transcript;
   removing one or more non-recognized words from the historical voice call transcript; or
   lemmatizing one or more phrases in the historical voice call transcript.

3. The system of claim 1, wherein the topic modelling algorithm comprises one of: a Latent Dirichlet Allocation (LDA) algorithm, a Latent Semantic Analysis (LSA) algorithm, a Latent Semantic Indexing (LSI) algorithm, or a Non-negative Matrix Factorization (NMF) algorithm.

4. The system of claim 1, wherein generating a historical topic flow for each historical voice call transcript comprises:
   determining a call duration associated with the historical voice call transcript; and
   dividing the historical voice call transcript into a plurality of text blocks based upon the call duration, wherein each text block comprises an equal portion of the call duration.

5. The system of claim 1, wherein generating a historical topic flow for each historical voice call transcript comprises:

determining a number of words in the historical voice call transcript; and dividing the historical voice call transcript into a plurality of text blocks based upon the number of words, wherein each text block comprises an equal portion of the number of words.

6. The system of claim 1, wherein determining a frequency of topic-related words in each text block and assigning a topic to each text block comprises, for each text block:

selecting a plurality of words in the text block;

determining a relationship between the selected plurality of words;

identifying a topic based upon the determined relationship; and assigning the identified topic to the text block.

7. The system of claim 6, wherein determining a relationship between the selected plurality of words comprises:

mapping the selected plurality of words to one or more topics in a database; and determining one of the topics that comprises a majority of the selected plurality of words.

8. The system of claim 1, wherein the one or more outcomes comprise a product purchase transaction, an account opening transaction, a website interaction transaction, or no transactions.

9. The system of claim 8, wherein categorizing the historical topic flow as positive or negative based upon the one or more outcomes associated with the historical voice call transcript comprises:

assigning a positive categorization to the historical topic flow when the one or more outcomes include a product purchase transaction, an account opening transaction, or a website interaction transaction; and assigning a negative categorization to the historical topic flow when the one or more outcomes include no transactions.

10. The system of claim 1, wherein converting the bitstream into unstructured computer text comprises executing a speech-to-text algorithm on the bitstream to generate the unstructured computer text.

11. The system of claim 1, wherein generating one or more topic recommendations for the current voice call based upon whether the topic flow for the current voice call is positive or negative by comparing the topic flow of the current voice call to a benchmark topic flow comprises:

generating a topic flow plot based upon the topic flow of the current voice call;

identifying one or more topics in the historical topic flows that are categorized as positive;

selecting one or more of the identified topics as topic recommendations for the current voice call; and appending the topic recommendations to the topic flow plot.

12. The system of claim 11, wherein transmitting the one or more topic recommendations to the second client computing device for display to the agent comprises:

displaying, on a display device of the second client computing device, the one or more topic recommendations while the current voice call is ongoing; and wherein the agent uses the displayed topic recommendations to introduce a new topic to the current voice call.

13. A computerized method used in a computing environment in which unstructured computer text is analyzed for generation of a recommended conversation topic flow, the method comprising:

executing, by the server computing device, a topic modelling algorithm on a plurality of historical voice call transcripts to determine a weighted distribution of topics present in each of the historical voice call transcripts;

generating, by the server computing device, a historical topic flow for each historical voice call transcript by determining a frequency of topic-related words in each of a plurality of text blocks in the historical voice call transcript and assigning a score to each text block based upon (i) the frequency of topic-related words that are related to a single topic from the weighted distribution of topics or (ii) a relationship between the frequency of topic-related words related to a plurality of topics from the weighted distribution of topics;

categorizing, by the server computing device, each historical topic flow as positive or negative based upon one or more outcomes associated with the historical call transcript for the historical topic flow;

training, by the server computing device, a voice call classification model using the categorized historical topic flows as input, the trained voice call classification model configured to generate recommended topic flows for incoming voice calls;

capturing, by the server computing device, a bitstream corresponding to a current voice call between a user of a first client computing device and an agent of a second client computing device and converting the bitstream into unstructured computer text;

executing, by the server computing device, the voice call classification model using the unstructured computer text as input to determine whether a topic flow of the current voice call is positive or negative;

generating by the server computing device, one or more topic recommendations for the current voice call based upon whether the topic flow of the current voice call is positive or negative by comparing the topic flow of the current voice call to a benchmark topic flow; and transmitting, by the server computing device, the one or more topic recommendations to the second client computing device for display to the agent.

14. The method of claim 13, further comprising one or more of:

removing, by the server computing device, one or more stopwords from the historical voice call transcript;

removing, by the server computing device, one or more non-domain-related words from the historical voice call transcript;

removing, by the server computing device, one or more non-recognized words from the historical voice call transcript; or lemmatizing, by the server computing device, one or more phrases in the historical voice call transcript.

15. The method of claim 13, wherein the topic modelling algorithm comprises one of: a Latent Dirichlet Allocation (LDA) algorithm, a Latent Semantic Analysis (LSA) algorithm, a Latent Semantic Indexing (LSI) algorithm, or a Non-negative Matrix Factorization (NMF) algorithm.

16. The method of claim 13, wherein generating a historical topic flow for each historical voice call transcript comprises:

determining, by the server computing device, a call duration associated with the historical voice call transcript; and dividing, by the server computing device, the historical voice call transcript into a plurality of text blocks based upon the call duration, wherein each text block comprises an equal portion of the call duration.

17. The method of claim 13, wherein generating a historical topic flow for each historical voice call transcript comprises:
  determining, by the server computing device, a number of words in the historical voice call transcript; and
  dividing, by the server computing device, the historical voice call transcript into a plurality of text blocks based upon the number of words, wherein each text block comprises an equal portion of the number of words.

18. The method of claim 13, wherein determining a frequency of topic-related words in each text block and assigning a topic to each text block comprises, for each text block:
  selecting, by the server computing device, a plurality of words in the text block;
  determining, by the server computing device, a relationship between the selected plurality of words;
  identifying, by the server computing device, a topic based upon the determined relationship; and
  assigning, by the server computing device, the identified topic to the text block.

19. The method of claim 18, wherein determining a relationship between the selected plurality of words comprises:
  mapping, by the server computing device, the selected plurality of words to one or more topics in a database; and
  determining, by the server computing device, one of the topics that comprises a majority of the selected plurality of words.

20. The method of claim 13, wherein the one or more outcomes comprise a product purchase transaction, an account opening transaction, a website interaction transaction, or no transactions.

21. The method of claim 20, wherein categorizing the historical topic flow as positive or negative based upon the one or more outcomes associated with the historical voice call transcript comprises:
  assigning, by the server computing device, a positive categorization to the historical topic flow when the one or more outcomes include a product purchase transaction, an account opening transaction, or a website interaction transaction; and
  assigning, by the server computing device, a negative categorization to the historical topic flow when the one or more outcomes include no transactions.

22. The method of claim 13, wherein converting the bitstream into unstructured computer text comprises:
  executing, by the server computing device, a speech-to-text algorithm on the bitstream to generate the unstructured computer text.

23. The method of claim 13, wherein generating one or more topic recommendations for the current voice call based upon whether the topic flow for the current voice call is positive or negative by comparing the topic flow of the current voice call to a benchmark topic flow comprises:
  generating, by the server computing device, a topic flow plot based upon the topic flow of the current voice call;
  identifying, by the server computing device, one or more topics in the historical topic flows that are categorized as positive;
  selecting, by the server computing device, one or more of the identified topics as topic recommendations for the current voice call; and
  appending, by the server computing device, the topic recommendations to the topic flow plot.

24. The method of claim 23, wherein transmitting the one or more topic recommendations to the second client computing device for display to the agent comprises:
  displaying, on a display device of the second client computing device, the one or more topic recommendations while the current voice call is ongoing; and
  wherein the agent uses the displayed topic recommendations to introduce a new topic to the current voice call.

* * * * *